Aug. 18, 1942.   F. N. BARD   2,293,585
SWIVEL JOINT
Filed Jan. 31, 1941   3 Sheets-Sheet 1

Inventor:
Francis N. Bard,
By Clinton, Wiles, Davies, Hirsch & Dawson,
Attys.

Aug. 18, 1942.    F. N. BARD    2,293,585
SWIVEL JOINT
Filed Jan. 31, 1941    3 Sheets-Sheet 2
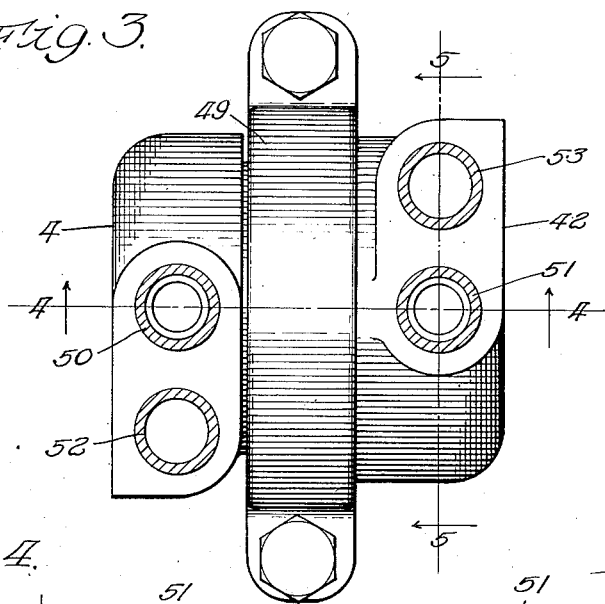
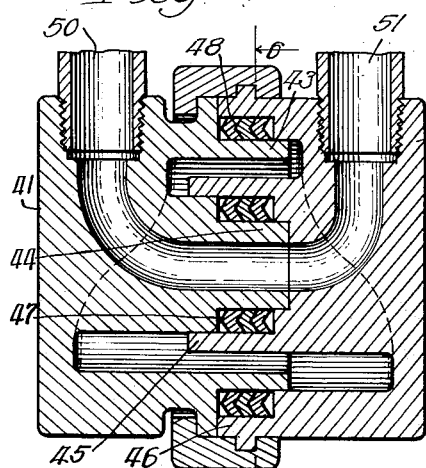
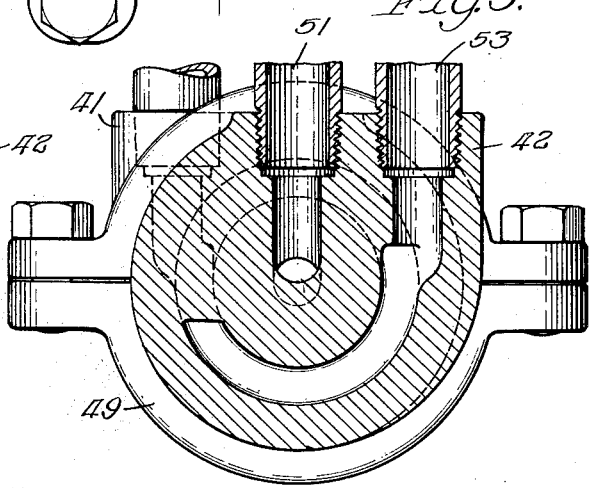
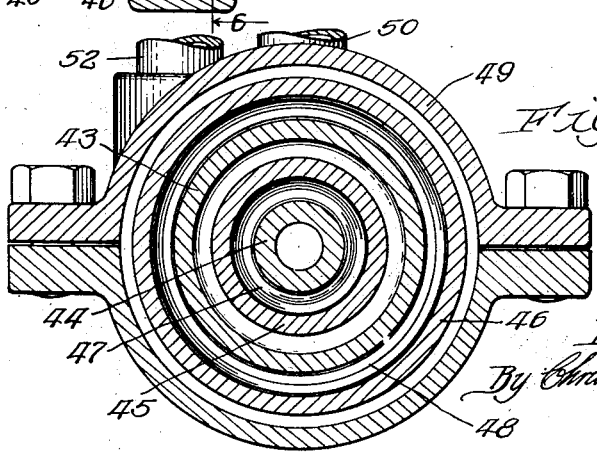
Inventor:
Francis N. Bard, Aug. 18, 1942.   F. N. BARD   2,293,585
SWIVEL JOINT
Filed Jan. 31, 1941   3 Sheets-Sheet 3
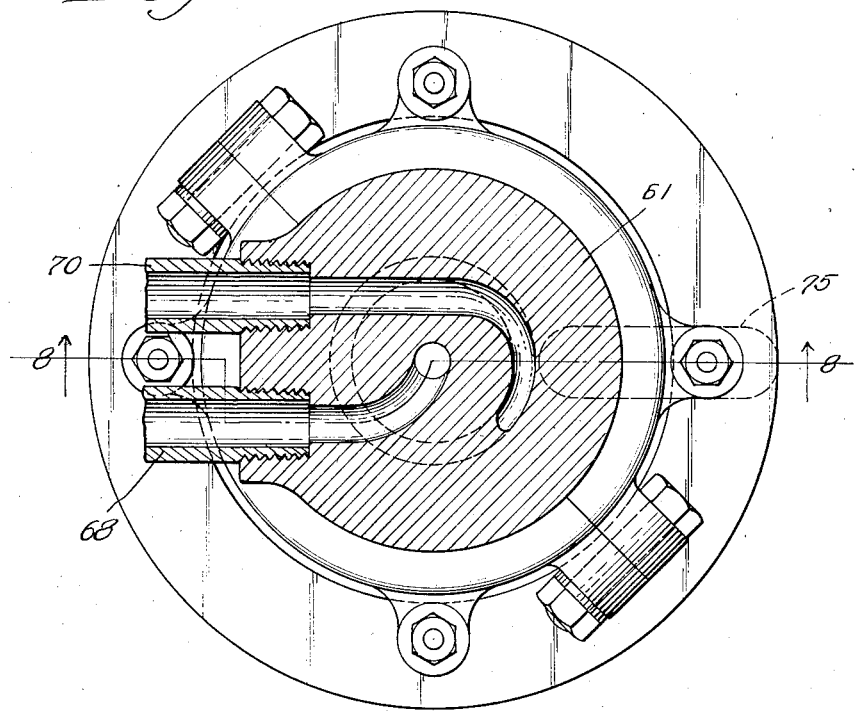
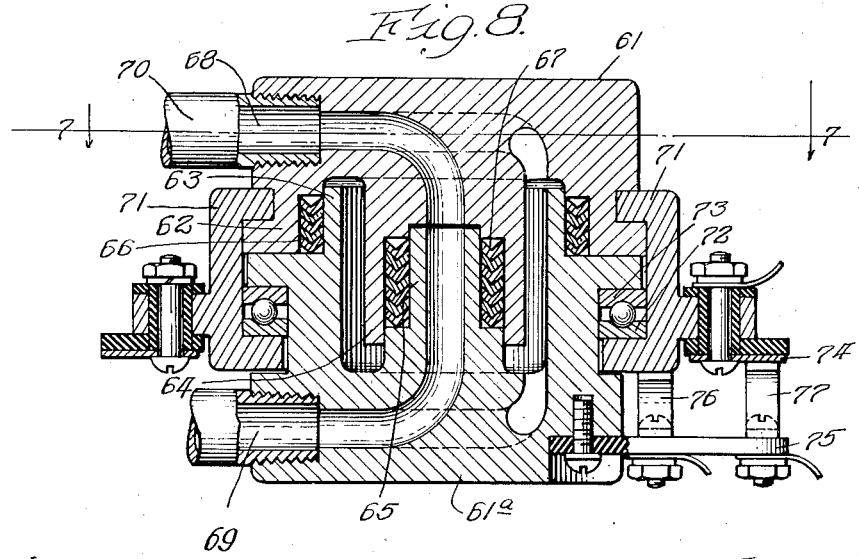
Inventor:
Francis N. Bard, Patented Aug. 18, 1942

2,293,585

UNITED STATES PATENT OFFICE 2,293,585

SWIVEL JOINT

Francis N. Bard, Highland Park, Ill.

Application January 31, 1941, Serial No. 376,903

6 Claims. (Cl. 285—97.3)

This invention relates to a swivel joint, and more particularly to a swivel joint adapted to provide two fluid-conducting paths or passageways in unbroken communication during rotation between the parts thereof.

Figure 1:
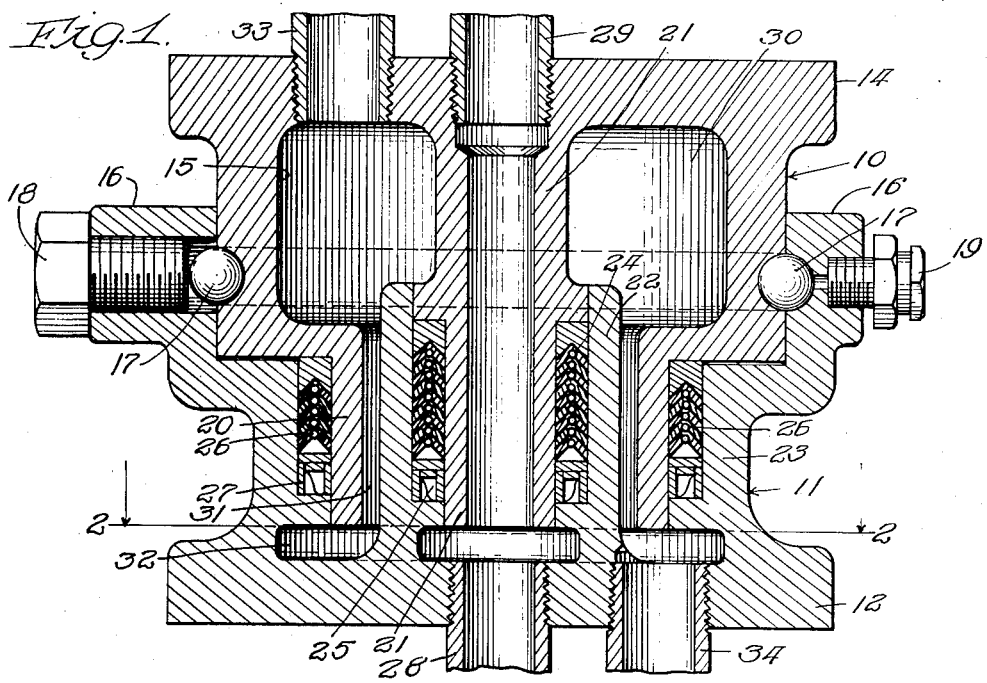
Figure 2:
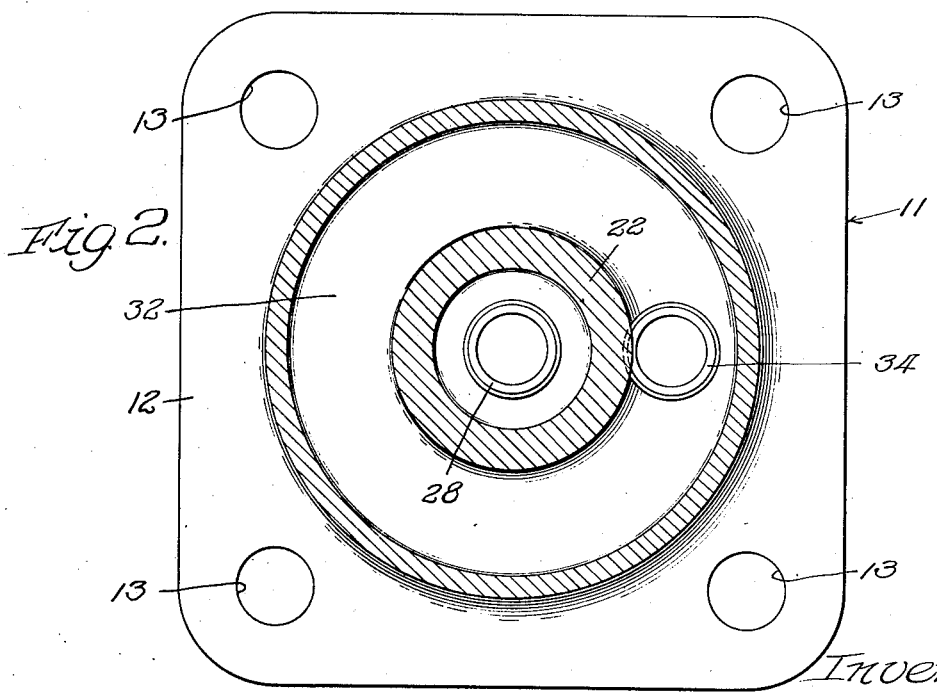

One feature of this invention is that it provides a fully rotatable swivel joint having two separate fluid paths therethrough; another feature of this invention is that such fluid paths are fully effective at all times despite the relative position of the joint elements; still another feature of this invention is that the joint may be designed to provide a support, freely and fully rotatable, for some device to which a fluid circuit is to be maintained, as a machine gun; other features and advantages of this invention will be apparent from the following specification and the drawings, in which:

Figure 1 is a vertical sectional view of a swivel joint embodying my invention; Figure 2 is a transverse view, partly in section, along the line 2—2 of Figure 1; Figure 3 is a top plan view of another form of my invention; Figure 4 is a sectional view along the line 4—4 of Figure 3; Figure 5 is a view, principally in section, along the line 5—5 of Figure 3; Figure 6 is a view along the line 6—6 of Figure 4; Figure 7 is a view, principally in section of another modification of my invention; and Figure 8 is a sectional view along the line 8—8 of Figure 7.

While freely and fully rotatable swivel joints for fluid conduits have heretofore been known and used, such joints have heretofore provided only one passageway or fluid path therethrough. I am here disclosing, in several forms, a swivel joint which has the advantage of free and unlimited rotatability, yet which always provides two fully effective separate fluid paths therethrough.

Moreover, in mounting some devices it has been found highly desirable to have some means which is both a swivel mounting and a fluid conduction joint, and which provides two completely separate fluid paths. One example of this is in a connection with the mounting of a liquid-cooled machine gun, as in the turret or gunner's cockpit of an airplane. In such an application the joint should provide a freely and fully rotatable support for the machine gun, and two completely separate fluid paths which are fully effective in any position of the gun, so that liquid can be pumped into the cooling jacket of the gun and then back out to some radiator or other heat transfer device.

In Figures 1 and 2 there is disclosed an embodiment of my invention particularly designed for such a use, although it is also obviously useful for a number of other purposes. The joint, referring first more particularly to Figure 1, comprises as its two principal parts an upper element, here indicated in general as 10, and a lower element 11. As may be better seen in Figure 2, the lower element is provided with a flange portion 12 having openings 13 designed to enable the lower element to be bolted to some base structure. The upper element is provided with a flange portion 14 which may be bolted to the device to be supported, as the machine gun, or to some intermediate supporting portion, such as a yoke, in turn furnishing support for the gun.

As may be best seen in Figure 1, the upper element 10 has a cylindrical portion 15 received within a female cylindrical portion 16 of the lower element 11. Registering semi-circular annular grooves are formed in each of these parts and ball bearings 17 are received by these grooves. The ball bearings may, for example, be inserted through the passageway provided by removal of the plug 18; and when in place they provide antifriction bearing means which maintain the two parts of the swivel joint in the desired operative relation and insure free swiveling of the upper element of the joint with respect to the lower element despite the fact that the upper element may be supporting a considerable load, as a heavy machine gun. Periodical oiling may be done, if desired, through another plug or lubricating fitting 19.

Each of the elements of the joint is provided with concentric cylindrical wall portions which are interleaved with each other when the elements of the joint are in operative relation, as shown in the drawings. The two concentric cylindrical wall portions of the upper joint element 10 are here identified as 20 and 21; and the upwardly extending cylindrical wall portions of the lower element 11 are here identified as 22 and 23. It will be noted that these wall portions provide confronting cylindrical surfaces adapted to engage sealing means or gaskets. Before describing the gaskets, it should be made clear that the use of words such as "upper" and "lower" are intended only to facilitate understanding of the swivel joint in the position in which it is shown in the accompanying drawings. If the joint were to be used in any other position it should be understood that the terms mentioned above are to be construed in accordance with the different positions.

Sealing means in the form of a plurality of annular gaskets 24 is here shown as sealingly engaging the outer surface of the cylindrical portion 21 of the upper element of the swivel joint, and the inner surface of the cylindrical portion 22 of the other joint element. The gaskets here shown are of a type which, for convenience of description, may be termed chevron-like. Appropriate shoulders are provided at either end of the space filled by the gaskets 24, and the gaskets are maintained under constant pressure by some resilient device, as the annular spring 25. Similarly, annular gaskets 26 of the same type, but of appropriately larger diameter, provide sealing engagement between the outer surface of the cylindrical portion 20 and the inner surface of the cylindrical portion 23 on the other element of the joint, effective sealing again being insured by the use of an annular spring 27. It is thus readily apparent that the ball bearings mechanically maintain the elements of the joint in the desired relationship while the gaskets or sealing means 24 and 26 provide the desired fluid seals; and that in both cases rotation of either element of the joint with respect to the other is provided for. Moreover, such rotation may continue in one direction for as many revolutions as is desirable, the rotation about a vertical axis being absolutely unrestricted.

Turning now to the passageway providing fluid conducting paths through the joint, it will be seen that there are two completely separate and distinct fluid paths, and that they are fully effective at any position of the elements with respect to each other or during rotation of one of the elements. One passageway coincides with the axis of rotation, being principally defined by the downwardly projecting cylindrical portion 21 of the upper joint element. It is readily apparent that any liquid or other fluid delivered to the joint by the pipe 28, for example, will pass through the joint in the central passageway and be delivered to the pipe 29; and this fluid path is fully effective at any position of the joint elements with respect to each other, or during rotation of one of them. The other pasageway comprises an annular passageway, concentric with the axis of rotation, having an enlarged upper portion 30, a reduced central portion 31, and a lower portion 32. Any liquid which may be returning from the device to which the joint is connected, as for example in the pipe 33, passes into this annular passageway and is delivered to the pipe 34. Since the second passageway is annular and concentric with the axis of rotation of the elements it also is fully effective at any relative position of the joint elements. It will also be readily apparent, from an examination of the drawings, that the gasket arrangement identified as 24 seals the inner passageway or fluid path from the second passageway encircling it; and that the outer gasket arrangement, here identified as 26, seals the outer annular passageway from loss of fluid to the exterior of the joint. The fact that all of the various wall portions cooperating with the gaskets and defining the passageways are concentric with each other and with the axis of rotation of the joint elements insures free rotatability and an exactly similar relationship of all the parts at any time. The provision of a central passageway coinciding with the axis and a second annular passageway encircling and concentric with it insures full effectiveness of both of these passageways at any time.

Another embodiment of my invention is illustrated in Figures 3 to 6. This form of my invention is a simpler type of swivel joint which can be more easily and cheaply built than the embodiment of my invention just described. It is, however, fully effective to maintain two separate fluid passageways at all times and to provide full rotatability.

Referring now more particularly to this latter form of my invention, the joint will be seen to comprise two principal cooperating parts or elements 41 and 42. The elements are again provided with interleaving concentric cylindrical wall portions, the element 41 having the portions here indicated as 43 and 44, and the element 42 having the portions here indicated as 45 and 46. Shoulders are provided on these various portions for defining annular spaces receiving the annular sealing gaskets 47 and 48; and for providing stop surfaces limiting movement of the elements toward each other. An encircling annular clamp member 49, which may for convenience be of two parts bolted together, engages annular shoulders on the two elements to maintain them in proper operative association while permitting rotation between them.

As before, two passageways for fluid flow through the joint are provided, these being so constructed and arranged that they are fully effective at all times. One of the passageways is substantially U-shaped with the parts in the position illustrated, having one terminal 50 and and another 51, the legs of the U-shaped passage connecting with a bottom portion which lies along and is concentric with the axis of rotation between the joint elements. The other fluid passageway has terminals here indicated as 52 and 53, the connecting passageway including an annular portion encircling the axial portion of the first-mentioned passageway and concentric therewith. The annular portion of the passageway (speaking with respect to the position of the parts as shown in Figure 4) is enlarged at the bottom and reduced in size at the top where it passes between the legs of the U-shaped passageway. This provides the maximum amount of flow space for a given size joint while maintaining sufficient wall strength at all points. It will be understood, of course, that the parts vary their relative positions in use.

Under any and all conditions, however, the parts provide two fluid passages through the joint, since the various parts of the paths are concentric and always register with each other at any position of the joint elements. Similarly, since the wall surfaces with which the gaskets 47 and 48 sealingly engage are cylindrical and concentric with the axis of rotation of the joint elements, a proper seal is at all times maintained without interference with the desired swiveling action.

Turning next to the form of my invention illustrated in Figures 7 and 8, it will be seen that an electrical circuit as well as a fluid circuit can be completed through a joint of this type. In this form of my invention the two principal parts or joint elements are indicated as 61 and 61ª, these being provided with interleaving concentric cylindrical wall portions 62, 63, 64, and 65. The annular gasket 66 lies between the opposed cylindrical surfaces of the walls 62 and 63; an annular passageway is provided between the walls 63 and 64; the annular gasket 67 makes sealing engagement with the cooperating surfaces of walls 64 and 65; and the other fluid passageway is provided by the U-shaped bore having its center portion lying along the axis of the joint and its legs terminating in the pipes 68 and 69. As before, one path of fluid flow through the joint is provided by the passageway passing along the axis thereof; and the other path is completed, as from the pipe 70, through the annular passageway between the walls 63 and 64, and then completed to another pipe not appearing on these views.

In order to maintain the joint elements in proper operative relation an annular clamping member 71, which may be in two parts for easy assembly, is provided. As may be best seen in Figure 8, this is provided with an inturned flange or shoulder engaging a shoulder in the joint element 61; and with a shoulder bearing against one element 72 of a ball race having its other element 73 in contact with a shoulder on the other joint element 61ᵃ. With this arrangement the annular holding member 71 rotates with the joint element 61, the balls providing antifriction bearing means between it and the other joint element.

The annular holding element 71 also carries a contact ring 74 concentric with the axis of the joint and insulated from it. The other joint element 61ᵃ is provided at some convenient point with an insulating strip or element 75 which carries two contact elements 76 and 77. The first of these bears against the shoulder of the holding member 71, providing an annular contacting surface; and the other contact element 77 bears against the contact ring 74. This is one convenient way of providing an electric circuit through the swivel joint as well as the fluid circuit with both being fully effective in any relative position of the joint elements.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A swivel joint providing two fluid conducting paths therethrough, including: a pair of joint elements; means maintaining operative association of the elements and providing for relative rotation therebetween about a given axis, each of the elements being provided with at least two annular surfaces concentric with said axis; two annular gaskets of different diameter, each gasket sealingly engaging one surface on one element and one surface on the other element; and two passageways through the elements, one having at least a portion lying along the axis and the other having an annular portion concentric with said axis and lying between the two gaskets.

2. A swivel joint providing two fluid conducting paths therethrough, including: a pair of joint elements, each element having concentric inner and outer annular portions; anti-friction bearing means maintaining operative association of the elements and providing for relative rotation therebetween about an axis coinciding with that of said cylindrical portions; two annular sealing means, each sealingly engaging one annular portion on one element and one annular portion on the other element; and two passageways through the elements, one entirely lying along and concentric with said axis and the other having an annular portion concentric with said axis and lying between the two sealing means.

3. A swivel joint providing two fluid conducting paths therethrough, including: a pair of cooperating joint elements; means maintaining operative association of the elements and providing for relative rotation therebetween about a given axis; a passageway through the elements having at least a portion along said axis; a second passageway through the elements separate from the first-mentioned passageway, the second passageway having an annular portion encircling and concentric with the first passageway to provide a second unbroken fluid path during relative rotation between the elements; and means sealing each of the fluid paths while providing for rotation between the elements, said last-mentioned means comprising a pair of spaced annular gaskets concentric with said axis.

4. A swivel joint providing two fluid conducting paths therethrough, including: a pair of cooperating joint elements; means maintaining operative association of the elements and providing for relative rotation therebetween about a given axis; a passageway through the elements having its central portion along said axis and its end portions divergent therefrom; and a second passageway through the elements separate from the first-mentioned passageway, the second passageway having an annular portion encircling and concentric with the central portion of the first passageway.

5. Apparatus of the character claimed in claim 4 wherein the first passageway is substantially U-shaped and the encircling portion of the second passageway is of reduced size where it passes between the legs of the first passageway.

6. A swivel joint providing two fluid conducting paths therethrough, including: a pair of joint elements, said elements being readily detachable and one of the elements being adapted to provide a base and the other a rotatable support; anti-friction bearing means maintaining operative association of the elements and providing for relative rotation therebetween about a given axis; a passageway through the elements along said axis, at least a portion being concentric therewith; a second passageway through the elements separate from the first mentioned passageway, the second passageway having an annular portion encircling and concentric with the first passageway to provide a second unbroken fluid path during relative rotation between the elements; and means sealing each of the fluid paths while providing for rotation between the elements, said last mentioned means comprising spaced annular gaskets concentric with said axis.

FRANCIS N. BARD.